April 2, 1929.  H. F. BLANCHARD  1,707,781
BRAKE MECHANISM
Filed March 1, 1924
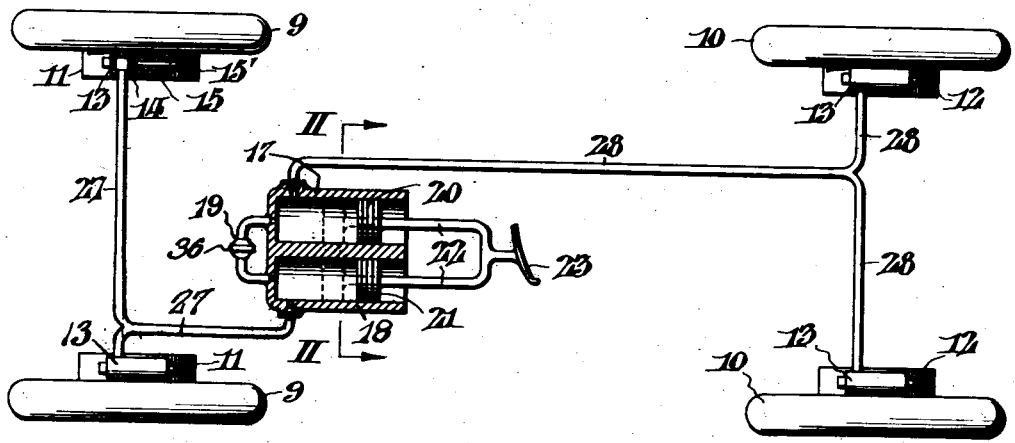
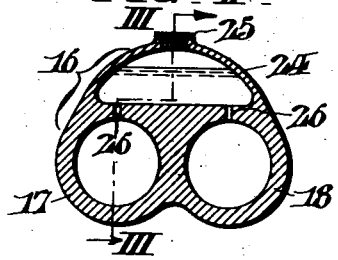 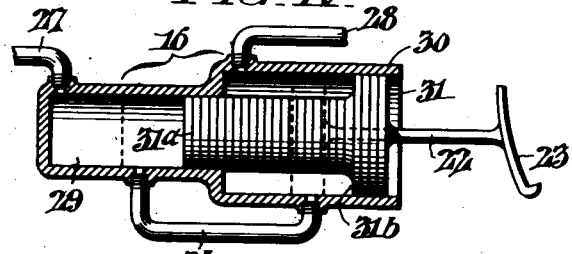
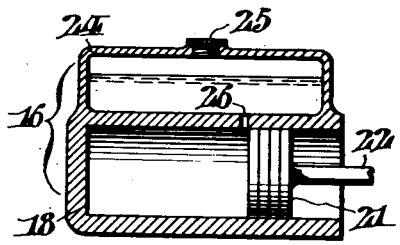 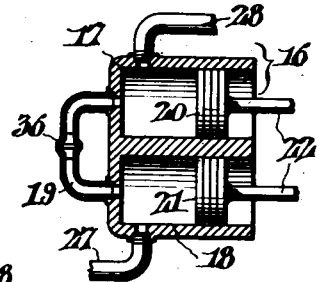
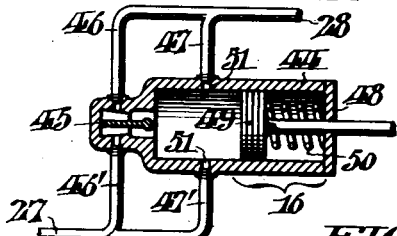 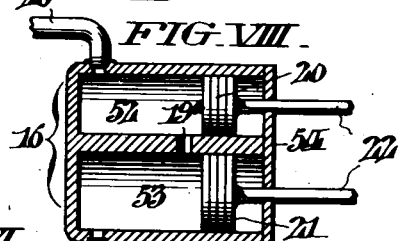
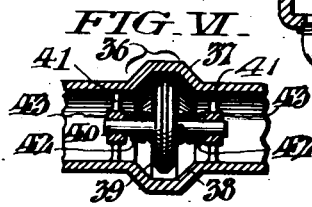
WITNESSES:  INVENTOR:
Harold F. Blanchard,
BY Fraley & Paul
ATTORNEYS.

Patented Apr. 2, 1929.

1,707,781

UNITED STATES PATENT OFFICE.

HAROLD F. BLANCHARD, OF TUCKAHOE, NEW YORK.

BRAKE MECHANISM.

Application filed March 1, 1924. Serial No. 696,143.

This invention relates to brake mechanism, and it has more particular reference to means whereby brakes operated by fluid pressure may be simultaneously applied to the wheels of self propelled vehicles.

The primary object of my invention is to provide a novel form of master control for fluid pressure brakes more particularly adapted for application to motor propelled vehicles having a plurality of pairs of wheels, said control being exceptionally reliable in operation and convenient to install.

Another object of this invention is to provide a brake control for all four wheels of an automobile, whereby, in the event of leakage, the efficiency of said control is only pro rata reduced, while the operator of the automobile is promptly notified of such leakage.

A further object of this invention is to provide an improved form of master control for fluid actuated brake systems which is simple in construction, easy to install, comprises but few parts, and which insures a maximum positive braking effect when operated.

With the foregoing and other objects in view as will be hereinafter referred to, or become apparent from the detailed description which follows, of certain forms and embodiments thereof, my invention consists essentially of a master control cylinder or cylinders the piston or pistons whereof are operatively connected to the brake pedal, means affording communication between the individual fluid actuated braking devices and said master cylinder or cylinders, and an equalizing means whereby—in the event of leakage at either side of the piston—the full braking pressure is only partially reduced.

In the further disclosure of the invention reference will be made—as the description proceeds—to the accompanying sheet of explanatory drawings constituting a part of this specification, and in which like characters of reference designate the same or corresponding parts in all the views.

Figure I is a diagrammatic plan of a brake system for motor vehicles embodying one form of my invention, certain parts being broken away and in section to better disclose underlying features.

Figure II is a transverse section of the master control taken substantially on the line II—II in the preceding figure, and drawn to an enlarged scale for the sake of clearness.

Figure III is a longitudinal section through the master control, as viewed on the line III—III in Fig. II.

Figure IV is a longitudinal section through a master control accommodating a compound piston.

Figure V is a sectional detail on a slightly larger scale illustrating the master control by-pass connection and two-way check valve included in the form of this invention shown by Figs. I–III.

Figure VI is an enlarged sectional detail of the by-pass check valve indicated in the preceding figure.

Figure VII is a fragmentary sectional view of a modified form of master control hereinafter more particularly referred to; and, Figure VIII is a sectional detail of a differential master control, the cylinders and pistons thereof being of different diameters, thus affording a novel means whereby the braking pressure applied to respective pairs of wheels may be of different degree.

Referring to the drawings, and more particularly to Figures I–III thereof, the numerals 9—9, 10—10 respectively designate the front and rear wheels of a motor propelled vehicle. These wheels 9—10 are shown provided with brake bands or shoes 11—12, respectively, of any standard construction, each of said bands or shoes being under the control and adapted for actuation by means of a fluid-pressure cylinder 13.

Each fluid-cylinder 13 accommodates a piston 14 normally projected in one direction by means of a compressible coil-spring 15, while the piston rod 15' is connected to the brake band or shoe in any of the well known ways; therefore, further detailed description is deemed unnecessary in that those conversant with the art will readily comprehend the manner of application of my invention thereto. Furthermore I lay no claim to the actuation of a brake band or shoe by means of a fluid-pressure device, as a feature of invention, per se.

The master control constituting the essence of this invention is comprehensively designated by the numeral 16, and it will be seen that it comprises a casting or the like of somewhat saddle-back cross-section, including parallel cylinders 17, 18 having an equalizing connection 19; or, said equalizing connection may consist of a port 19ª intermediate said cylinders—as showing in Fig. VIII. These cylinders 17, 18 are fitted with appropriately packed fluid-tight pistons 20, 21 respectively, preferably of the skirt type the same being operatively connected by an appropriate linkage 22 with the brake pedal 23. Above the aforesaid parallel cylinders 17, 18 is a fluid supply tank 24, fitted with a filler cap 25, and it will be readily understood that the fluid in said tank 24 may be placed under compression. Each of the aforesaid cylinders 17, 18 is connected by a small port 26 with the supply tank 24, while a bifurcated pipe 27 connects the cylinder 18 with the fluid pressure cylinders 13 associated with the front brake bands or shoes 11—11. A similar bifurcated pipe 28 connects the other cylinder 17 with the fluid pressure cylinders 13—13 associated with the rear brake bands or shoes 12—12. Obviously the bifurcated portions of the pipe connection 27 will be flexibly joined to the fluid pressure cylinders 13, 13 to compensate and accommodate the angular motions of the front wheels 9, 9 during steering of the vehicle.

In operation it will be readily understood that so long as no leakage exists—or is set up—in any part of the system, that the pistons 20, 21 will act in unison due to the provision of the equalizing connection 19 which ensures an equal pressure on each said piston. Furthermore the normal operation of the brake pedal 23 will not cause the pistons 20, 21 to be moved far enough to close the inlet ports 26, whereby the cylinders 17, 18 as well as the equalizing connection 19 are maintained normally full of the pressure fluid. However, should a leakage occur in any part of the system connected with either one of the cylinders 17, 18 of the master control 16, depression of the brake pedal 23 will result in the pistons 20, 21 being moved over as indicated by the dotted lines shown in Figure I, whereupon said pistons will be freed to operate independently. The piston 20 or 21 associated with that side of the system in which the leak exists will obviously effect a reduced, or no retarding action upon its associated brake bands or shoes 11 or 12; while the other piston will actuate the brake bands or shoes of its associated brake drums under full pressure. Obviously, the full braking pressure of the system will be reduced substantially fifty per cent, and the car operator instantly warned that a leakage occurs, due to the extra travel of the pedal 23, as well as the reduced resistance to braking pressure.

It will also be readily understood from the foregoing that I may provide any multiple of cylinders 17, 18 in the master control 16, whereby—when a leakage occurs—the braking pressure may be proportionately graduated; or, in other words, the brake power of my novel system can be proportioned in direct ratio to the number of co-ordinated cylinders 17, 18.

Referring now to Figure IV, it will be observed that the master control 16 includes co-extensive and coaxial cylinders 29, 30 of different diameter, accommodating a compound piston 31, which is connected to the brake pedal 23 by a linkage 22 as hereinbefore described. It is to be particularly noted that the effective area of the cylinders 29, 30 may, conveniently, be co-equal, or, in other words the area of the smaller portion 31$^a$ of the compound piston 31 is equal to that of the effective part 31$^b$ of said piston. In this form of my invention I dispense with the cylinder end connection 19, and in place therefor, employ a longitudinally directed equalizer conduit 35. It will be clearly apparent to those conversant with the art that the operation of this form of my invention will be identical with that of the form illustrated in Figures I–III and V inclusive, by virtue of a co-equal pressure acting on both effective areas of the piston 31.

From Figures V and VI, it will be seen that the master control 16 is the same as shown by Figures I–III, and that the equalizing connection consists of a pipe 19 intermediate the ends whereof is fitted a two-way check valve, comprehensively designated by the numeral 36. It is also noteworthy that the pipe connection 35 is preferably fitted into the heads of the cylinders 17, 18 to ensure more sensitive action of the valve 36.

The aforesaid two-way check valve 36—shown on an enlarged scale in Figure VI—comprises a bulbous portion 37 conveniently fitted in the pipe 19 to afford opposed valve seats 38, with which the valve 39 is adapted to cooperate, as hereinafter set forth. This valve 39, it will be noted, is freely mounted on a spindle 40, supported by spiders 41, and it is under the action of opposed compressible or buffer springs 42, abutting between said valve and the bearing portions 43 of the aforesaid spiders 41. Thus it will be readily apparent that, with such assemblage, when a leak occurs the "good" half of the system becomes effective instantly the pedal 23 is depressed.

Instead of providing the master control 16 with two cylinders 17, 18 each of which communicates with a pair of brake bands or shoes 11 and 12, I may employ one cylinder 44 only—as shown in Fig. VII—and provide said cylinder at its head end with a two-way check valve 45, conveniently of the butterfly-type. In this form of my invention, the pipes 27, 28 affording communication with the fluid pressure cylinders 13 are branched at 46—46′ 47—47′, respectively, to connect with the butterfly check valve 45, and the cylinder 44. It is also observable that, I close in the outer end of the cylinder 44 with a cover 48 between which and the piston 49 there may be interposed a compressible coil spring 50. Now it will be quite clear that, when no leakage occurs, the piston 49 will not travel beyond— or pass over—the openings 51 connecting into the branches 47, 47' aforesaid; but, when leakage does occur, the loss of liquid in the system will permit the piston 49 to traverse and cover said openings 51. The butterfly check valve 45 is so designed, and of such sensitive calibration, that a very slight movement of liquid passing therethrough will close it; so that when a leakage occurs in the system served by the line 27—for example—the reduced flow of liquid passing the check valve 45 into the branch 46' will automatically close said check and thereby cut-off the leaky half of the system, while in no wise effecting the line 28. Obviously a reverse effect will obtain when a leak occurs in the line 28. It is to be particularly observed at this juncture that the showing of the valve 45 is purely diagrammatic and not intended to portray a strictly mechanical assemblage, seeing that any convenient design of check valve may be employed, as will be readily understood. By using a less delicately adjusted check valve 45, the branches 47—47' may be eliminated, and equalization only effected through the branches 46—46'.

In the further modified form of the invention shown by Figure VIII, it will be seen that the cylinders 52, 53 of the master control 16, are of different diameter, and that said cylinders may be closed-in by a cover 54. This differential form of my invention affords provision whereby the braking pressure applied to any associated pair of the fluid-pressure actuated cylinders 13, 13 may be of different degree. In other words, when the cylinders 52. 53 are of different diameters it will be obvious that a greater braking pressure will be applied to the brakes associated with the larger cylinder 53 or cylinders, and vice versa with respect to those controlled by the cylinder 52. This feature I deem of importance when my invention is applied to motor-propelled vehicles, in that a greater retardative force may be exerted on the traction wheel brakes than that applied to the steering wheel brakes, whereby the factor of driving safety is increased and skidding effectively prevented, while an efficient means is provided whereby a heavy machine may be brought to a sudden stop with more positive certainty than has heretofore obtained.

An important advantage inhering to the use of a differential master control having cylinders 52, 53 connected by an equalizing port 19$^{a'}$, as shown in Fig. VIII, is that the braking action may be automatically proportioned between the front and rear wheels as desired. For example, with sixty per cent total weight on the rear wheels 10, 10, forty per cent on the front wheels 9, 9, a car maker might wish to split the braking action or pressure proportionately thereto to prevent locking of the front wheels until after the rear wheels were locked. Such an end—as a result of my invention—can be simply attained by proportioning the master cylinders 52, 53 respectively serving the front and rear wheel accordingly.

An important detail in connection with the form of this invention shown in Fig. VIII is, the equalizing passage or port 19$^{a'}$ must be so located with reference to the piston stroke so that the pistons will close said passage or port shortly after the brake pedal 23 has been moved sufficiently to eliminate all lost motion in the system. This may be regarded as accomplished as soon as the brakes have been very slightly applied, while further pressure on the brake pedal 23 results in braking the front and rear wheels 9, 10 according to the ratio adopted when proportioning the respective areas of the pistons 52, 53. Obviously, with this modification, all danger of locking the front wheels 9, 9 when the brakes are suddenly applied with full force—or in an emergency—is effectively prevented and the factor of safety thereby considerably increased.

From the foregoing description it will be clearly apparent that a braking system provided with a master control 16 as hereinbefore described will be exceedingly efficient, while its particular adaptability to a four-wheel brake assemblage is unquestioned. Furthermore, the simplicity and effectiveness with which the master control 16 governs the operation of the several brakes on a motor propelled vehicle are obvious, while the numerous advantages inhering thereto are so self evident that further description or enumeration thereof is deemed unnecessary.

Finally, I desire it to be clearly understood, that I do not limit myself to the particular embodiments and assemblages hereinbefore outlined and illustrated, since the invention not only may be included in various specific constructions, but it may also be employed for other purposes than that set forth, without departing from the spirit of said invention, or the scope of the sub-joined claims. Having described my invention, I claim:

1. In a braking system of the character described, a master control including a plurality of cylinders having a pressure equalizing connection, means affording a constant supply of fluid to said cylinders, coordinated pistons in the cylinders adapted to shut-off the supply of fluid and automatically close the equalizing connection when a leakage occurs in any part of the system, and means for normally moving said pistons to shut-off fluid supply and effect brake applying pressure.

2. In a braking system of the character described, a master control embodying a plurality of cylinders having a pressure equalizing connection and a storage for a constant supply of fluid to said cylinders, coordinated pistons in the cylinders adapted to shut-off the supply of such fluid to any section of the system in which a leakage occurs, whereby the effective pressure is gradually reduced, and means for moving said pistons to effect brake applying pressure.

3. In a braking system of the character described, a master control embodying a plurality of cylinders having a pressure equalizing connection and saddle storage for a constant supply of fluid to said cylinders, coordinated pistons in the cylinders adapted to shut-off the supply of such fluid to any section of the system in which a leakage occurs without affecting the remaining sections whereby the effective pressure is gradually reduced, and means for moving the aforesaid pistons to effect brake applying pressure.

4. In a braking system of the character described, a master control including a plurality of cylinders having a pressure equalizing connection, a two-way check in said equalizing connection functional to automatically cut-out either side of the system wherein a leakage occurs, means affording a constant supply of fluid to said cylinders, coordinated pistons in the cylinders adapted to automatically cut-off fluid supply from any part of the braking system when a leak occurs therein, and means for normally moving said pistons to effect brake applying pressure.

5. In a braking system of the character described a master control including a plurality of cylinders having a pressure equalizing connection, a two-way spring balanced valve in said equalizing connection functional to automatically cut-out either side of the system wherein a leakage occurs, means affording a constant supply of fluid to said cylinders, coordinated pistons in the cylinders adapted to automatically cut-off fluid supply from any part of the braking system when a leak occurs therein, and means for normally moving the pistons to effect brake applying pressure.

In testimony whereof, I have hereunto signed my name at New York City, New York, this 20th day of February, 1924.

HAROLD F. BLANCHARD.